No. 830,778. PATENTED SEPT. 11, 1906.
H. R. GEER.
METAL CUTTING SAW.
APPLICATION FILED DEC. 31, 1904.
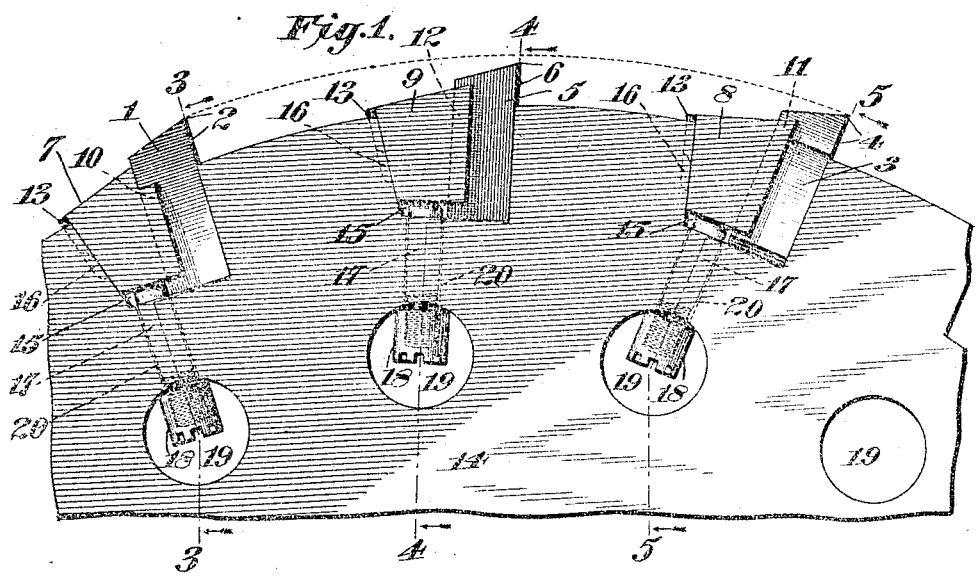
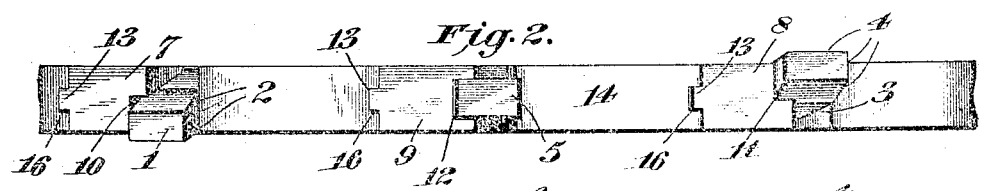
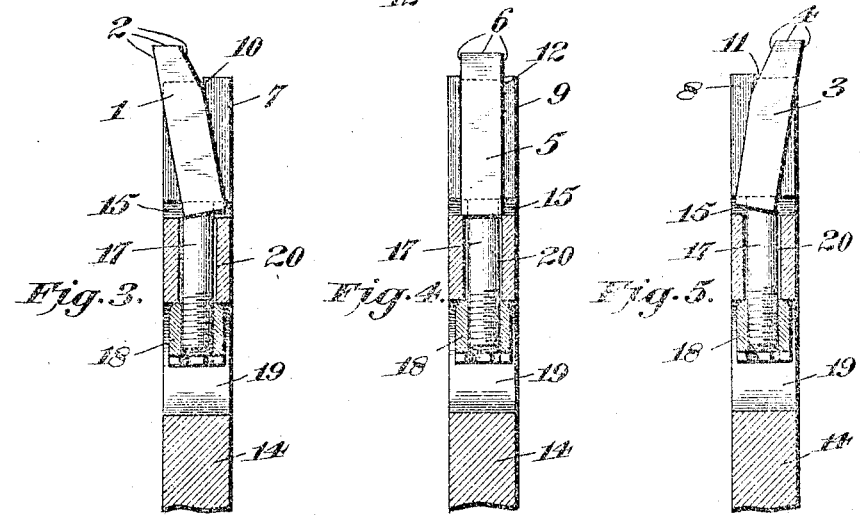
WITNESSES,
Elmer Leavey
Geo Beatty
INVENTOR.
Harry R. Geer.
by Geo. E. Thackray
his ATTORNEY

UNITED STATES PATENT OFFICE.

HARRY R. GEER, OF JOHNSTOWN, PENNSYLVANIA.

METAL-CUTTING SAW.

No. 830,778.

Specification of Letters Patent.

Patented Sept. 11, 1906.

Application filed December 31, 1904. Serial No. 239,108.

*To all whom it may concern:*

Be it known that I, HARRY R. GEER, a citizen of the United States, residing at Johnstown, in the county of Cambria and State of Pennsylvania, have invented certain new and useful Improvements in Metal-Cutting Saws; and I do hereby declare the following to be a full, clear, and exact description of the invention, such as will enable others skilled in the art to which it appertains to make and use the same.

My invention relates to novel improvements in metal-cutting saws with insertible saw-teeth or cutters, and has special reference to the shape of said teeth or cutters, also to their novel arrangement on the periphery of the saw-disk; and my object is to provide saw-teeth of an economical form which can be arranged on the disk of a saw in a practical manner, easily adjusted by the aid of locking-pieces provided therewith, and securely held in their operative positions.

In general my invention consists of saw-teeth or cutters which are composed of plain and preferably rectangular pieces of tool-steel provided with cutting edges ground thereon, said saw-teeth being adjustably secured in the periphery of a saw-disk in an alternating manner.

Having thus given a general description of my invention, I will now in order to make the same more clear refer to the one sheet of drawings, which form part of this specification, and in which like characters refer to like parts.

Figure 1 is a side elevation of a portion of a saw-disk, illustrating my improvements, while Fig. 2 is a top plan view thereof. Fig. 3 is a section on line 3 3 of Fig. 1. Fig. 4 is a section on line 4 4 of Fig. 1, and Fig. 5 is a section on line 5 5 of Fig. 1.

Referring now to the characters of reference shown on the drawings, 1 represents a right-hand saw-tooth with cutting edges 2 formed on its outer end, while 3 represents a saw-tooth similar in all respects to the tooth 1, except that its cutting edges 4 are so formed as to make the tooth 3 of the opposite hand to tooth 1, and 5 represents a center tooth with cutting edges 6 symmetrical about the center line of said tooth.

7, 8, and 9 are locking-pieces similar in all respects to each other, except that their grooves 10, 11, and 12 are right-hand, left-hand, and central, respectively, as shown, to conform to the inclination of the various teeth, and each is provided with a tenon 13, a shank 17, and a nut 18.

14 is the saw disk or blade, which is provided with recesses 15 in its periphery and groove 16, located at the rear side of said recesses.

20 is a socket or opening extending from the recess 15 to and connecting with the aperture 19. The shank 17 of the locking-piece extends through said socket 20 with its end projecting into the aperture 19, which latter provides a place for the nut 18, which is mounted on the threaded end of shank 17 aforesaid, as shown. Although only one tooth of each kind is shown on the drawings, it will be understood that the entire periphery of the saw-disk is provided with teeth, as shown in series.

Referring now to Figs. 2, 3, 4, and 5, it will be seen that the teeth 1 and 3 project from the saw-disk on opposite sides of its center line and extend slightly beyond the planes of its respective sides, while the tooth 5 is stationed on the center line of the saw-disk between the teeth 1 and 3 and projects beyond the saw-disk a shorter distance, as shown in Fig. 1. By this arrangement of the teeth 1 and 3 any binding of the saw-disk is prevented. Furthermore, any tendency of the teeth to crowd together, and thereby cause fracture of the same, is counteracted by the location of the center tooth 5, the upper edge of which is nearer the saw-axis than the upper edges of the other teeth, thus temporarily leaving an abutment of material in the center of the cut to counteract the thrust from the exterior of the right and left teeth, which abutment remaining between the cuts of the right and left teeth 1 and 3 is eventually removed by said center tooth 5, as will be readily understood from the arrangement of the various teeth aforesaid. This arrangement of simple teeth is an important and particular feature of my invention.

The construction of the locking-pieces and means for securing the saw-teeth in position are not included in this present invention, but form part of the subject of another application for United States Letters Patent, filed on the same date, Serial No. 239,109.

Although I have shown and described my improvements in considerable detail, I do not wish to be limited to the exact and specific details shown or described, but may use such substitutions, modifications, or equivalents thereof as are embraced within the scope of my invention and as pointed out in the claims.

Having thus described my invention, what I claim, and desire to secure by Letters Patent, is—

1. In a metal-saw, a plurality of insertible teeth, each composed of substantially plain rectangular pieces of metal, with cutting edges on the ends thereof and mounted in the periphery of a metallic disk, said teeth being of three kinds, namely: a right-hand tooth, a left-hand tooth and a center tooth, the outer cutting edges of said center tooth being nearer the axis of the saw than the outer cutting edges of the other teeth, the arrangement of said teeth being such as to leave a central abutment of metal in the cut, thus balancing the pressure on said right-hand and left-hand teeth, thereby holding them up to their work, and means for securing said teeth in position.

2. In a metal-saw, a plurality of inserted metal teeth of three kinds with cutting edges on the ends thereof, and mounted in the periphery of a metallic disk namely: a right-hand tooth, a left-hand tooth and a center tooth, the outer cutting edges of said center tooth being nearer the saw-axis than the outer cutting edges of the other teeth, said right-hand and left-hand teeth being composed of rectangular pieces of steel shaped to a blunt bevel on their outer ends, said center tooth being substantially rectangular throughout; the arrangement of said teeth being such as to leave a central abutment of metal in the cut, thus balancing the pressure on said right-hand teeth and left-hand teeth, thereby holding them up to their work, and means for securing said teeth in position.

3. In a metal-saw, a plurality of insertible teeth, each composed of a substantially plain rectangular piece of metal with cutting edges on the ends thereof and mounted in the periphery of a metallic disk, said teeth being of three kinds, namely: a tooth inclined toward the right hand, a tooth inclined toward the left hand and a tooth centrally located, all with respect to the median plane of said saw-disk; the extreme cutting edges of said center tooth being nearer the axis of the saw than the outer edges of the other teeth, the arrangement of said teeth being such as to leave a central abutment of metal in the cut, thus balancing the pressure on said right-hand teeth and left-hand teeth, thereby holding them up to their work, and means for securing said teeth in position.

In testimony whereof I hereto affix my signature in the presence of two witnesses.

HARRY R. GEER.

Witnesses:
GEO. BEATTY,
ELMER LEAVEY.